United States Patent
Mori et al.

(10) Patent No.: US 9,772,713 B2
(45) Date of Patent: Sep. 26, 2017

(54) DISPLAY DEVICE

(71) Applicant: Panasonic Intellectual Property Management Co., Ltd., Osaka (JP)

(72) Inventors: Ken Mori, Osaka (JP); Takuya Nishimura, Osaka (JP); Yasuo Masuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 32 days.

(21) Appl. No.: 15/082,403

(22) Filed: Mar. 28, 2016

(65) Prior Publication Data

US 2016/0209981 A1 Jul. 21, 2016

Related U.S. Application Data

(63) Continuation of application No. PCT/JP2015/000434, filed on Feb. 2, 2015.

(30) Foreign Application Priority Data

Mar. 28, 2014 (JP) ................................. 2014-068176
Dec. 18, 2014 (JP) ................................. 2014-256027

(51) Int. Cl.
*G06F 3/041* (2006.01)
*G06F 3/0354* (2013.01)

(52) U.S. Cl.
CPC ........ *G06F 3/0416* (2013.01); *G06F 3/03542* (2013.01); *G06F 3/03545* (2013.01); *G06F 3/0412* (2013.01); *G06F 2203/04104* (2013.01)

(58) Field of Classification Search
CPC ....... G06F 2203/04104; G06F 3/03542; G06F 3/03545; G06F 3/0412; G06F 3/0416

(Continued)

(56) References Cited

U.S. PATENT DOCUMENTS 5,313,051 A 5/1994 Brigida et al.
2012/0013555 A1 1/2012 Maeda et al.

FOREIGN PATENT DOCUMENTS

EP 2 711 825 3/2014
JP 6-28380 2/1994

(Continued)

OTHER PUBLICATIONS

International Search Report dated Mar. 24, 2015 in corresponding International Application No. PCT/JP2015/000434.

(Continued)

*Primary Examiner* — Tony Davis
(74) *Attorney, Agent, or Firm* — Wenderoth, Lind & Ponack, L.L.P.

(57) ABSTRACT

A display device is connectable to a plurality of electronic pens and has a screen on which information is displayed in accordance with inputs from a plurality of electronic pens and a touch input. The display device includes a touch detection sensor, a wireless communication section, a display controller, and a touch panel controller. The touch detection sensor detects a touch on the screen. The wireless communication section receives signals from the plurality of electronic pens connected. The display controller determines a distance between at least two electronic pens out of the plurality of electronic pens connected, from the signals received via the wireless communication section. The touch panel controller enables or disables a function of the touch detection sensor based on the above determination.

9 Claims, 6 Drawing Sheets

(58) Field of Classification Search
USPC .................................................. 345/170–176
See application file for complete search history.

(56) References Cited

FOREIGN PATENT DOCUMENTS

| | | |
|---|---|---|
| JP | 2007-195771 | 8/2007 |
| JP | 2012-164274 | 8/2012 |

OTHER PUBLICATIONS

The Extended European Search Report dated Feb. 1, 2017 for the related European Patent Application No. 15768412.7.

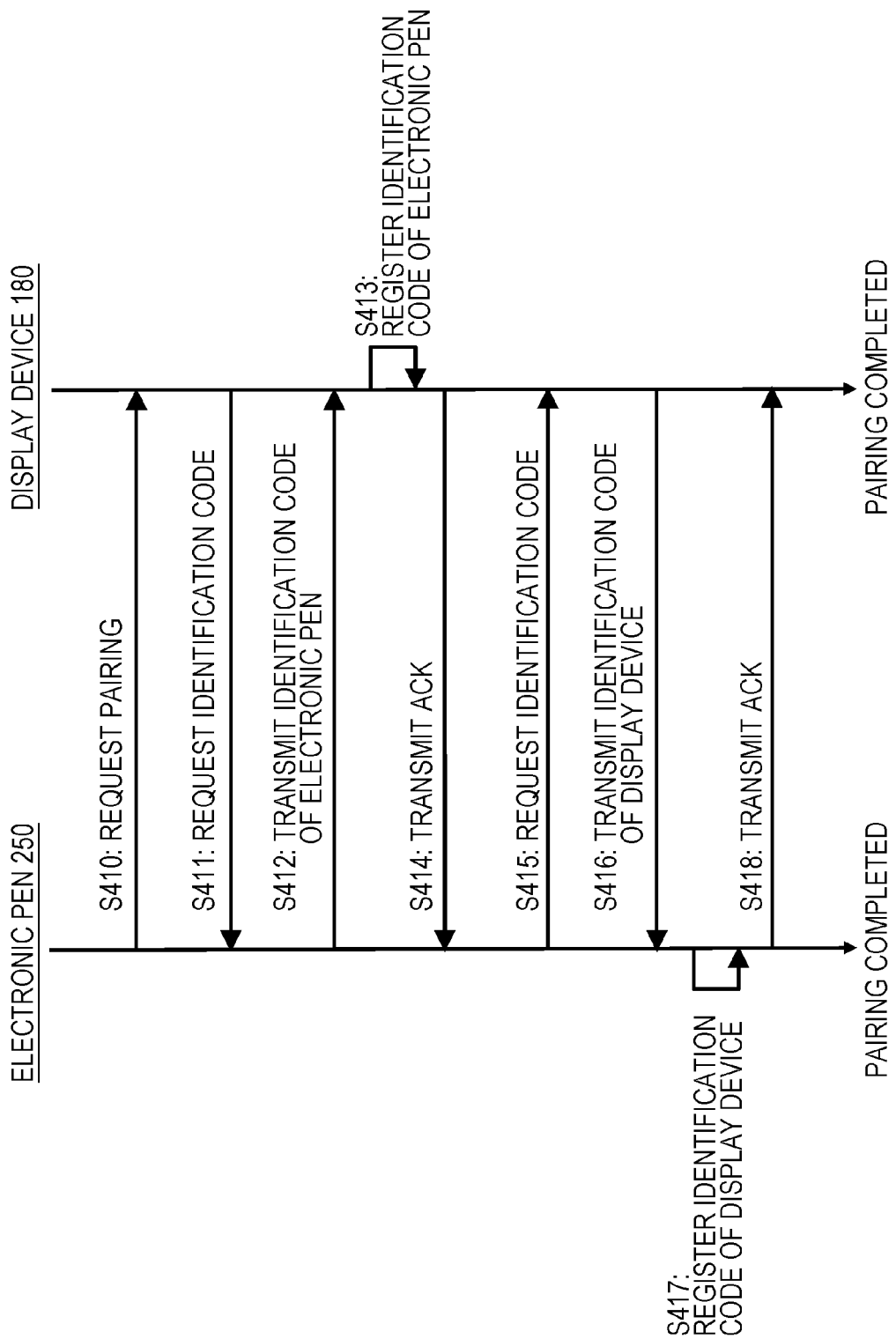

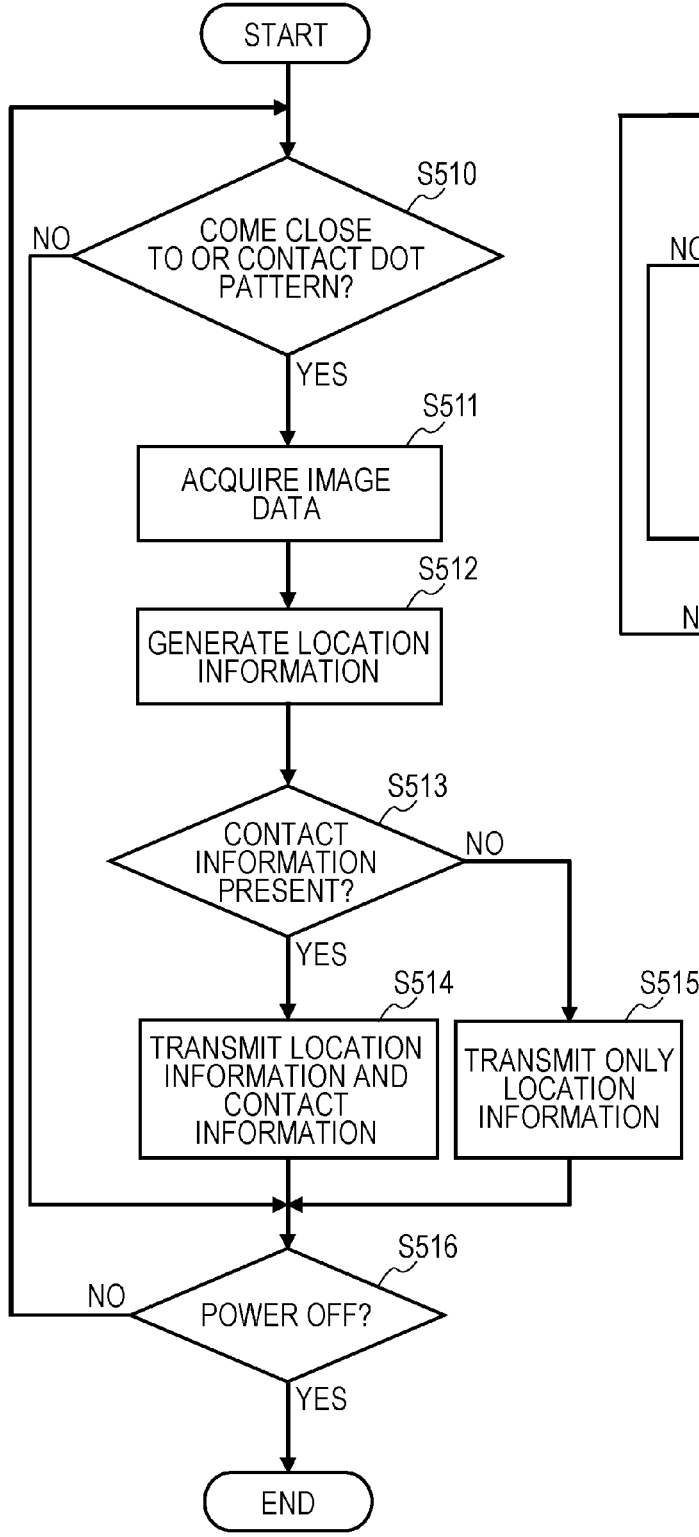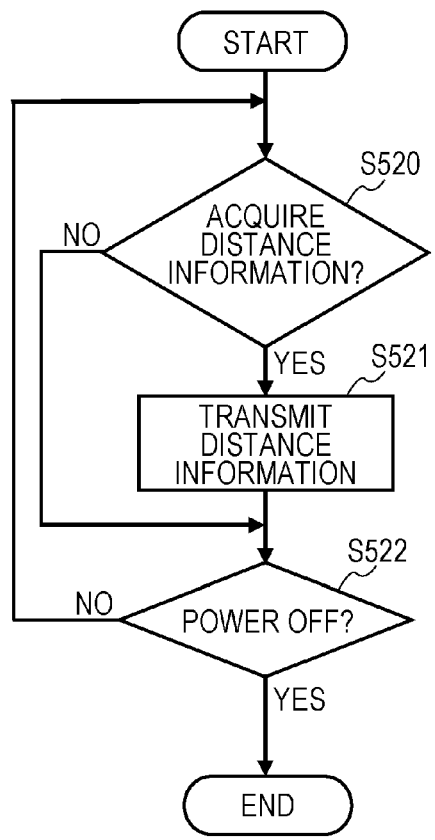

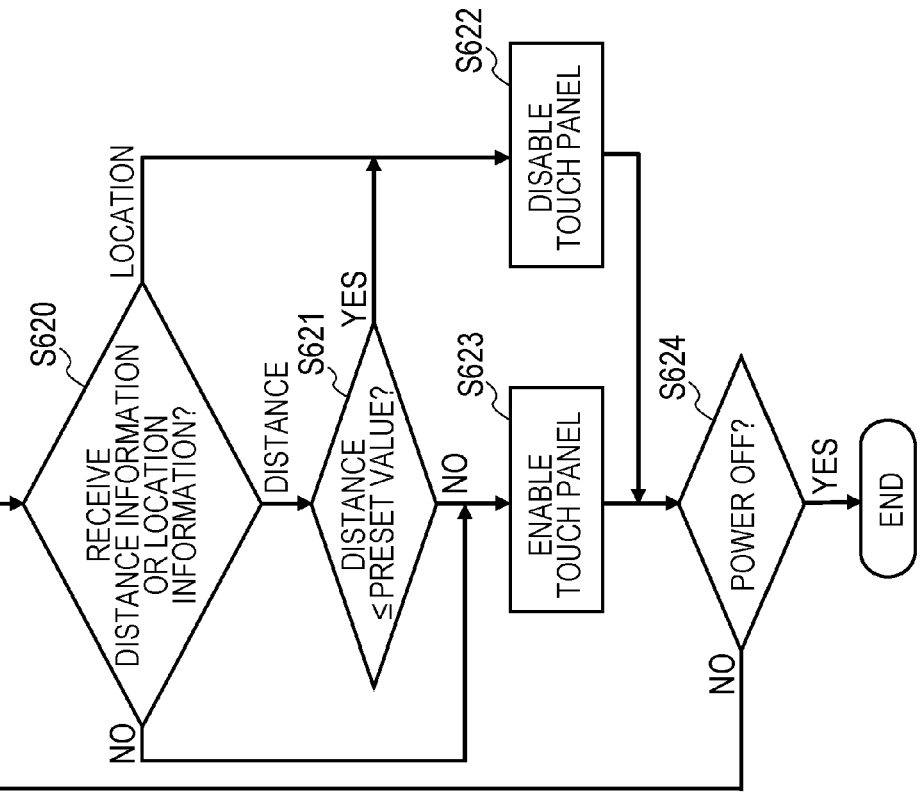
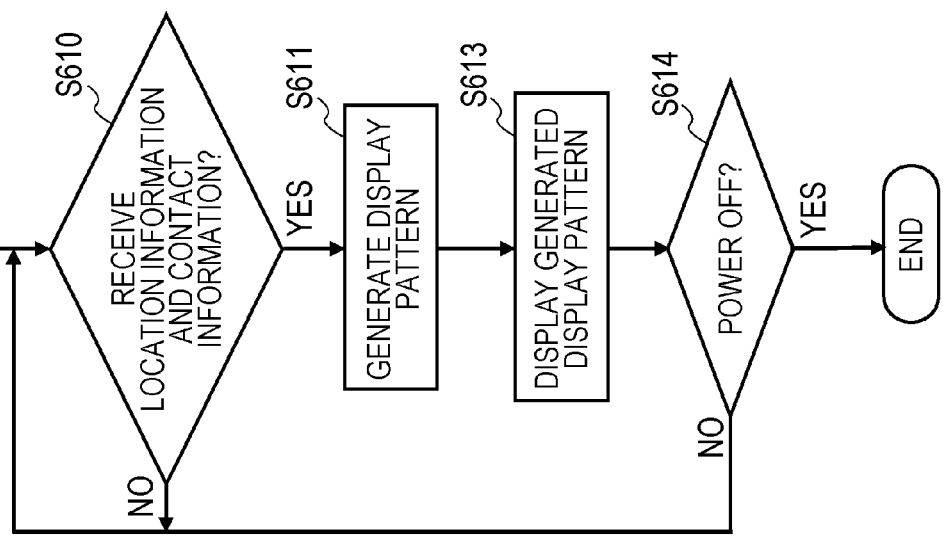

DISPLAY DEVICE

BACKGROUND

1. Technical Field

The present disclosure relates to a display device to which information can be input through operations of input devices, such as electronic pens, and a touch panel.

2. Description of the Related Art

Unexamined Japanese Patent Publication No. 2007-195771 discloses a gaming machine with a support function which, when operated with a plurality of pens, accepts only the input from the last dedicated pen that has contacted the touch panel.

When drawing operations are performed on a large screen of a display device by using a plurality of electronic pens simultaneously, there are cases where a hand with an electronic pen and the other hand without an electronic pen accidentally contact the touch panel. In this case, the display device may accept not only the inputs from the electronic pens but also the inputs from the hands that have contacted the touch panel, thereby performing drawing operations on the basis of those erroneous inputs. This might impair the usability of this display device.

An image sensor type electronic pen reads a dot pattern disposed on a touch panel by using an image sensor, and generates location information regarding the electronic pen on the touch panel. On the basis of the location information transmitted from the electronic pen, a display device displays an image and any other objects. In this case, if the image sensor of the electronic pen does not face the dot pattern or the touch panel, the display device may be unable to determine whether the electronic pen is placed close to the touch panel. Therefore, even when a plurality of input means, including an electronic pen and user's hands, are placed over the screen, the display device may fail to perform input control, such as the assignment of a higher priority to the input from the electronic pen.

SUMMARY

A display device in the present disclosure is connectable to a plurality of input devices and has a screen on which information is displayed in accordance with inputs from a plurality of input devices and a touch input. The display device includes a touch detection sensor, an information receiver, a display controller, and a touch panel controller. The touch detection sensor detects a touch on the screen. The information receiver is capable of receiving signals from the plurality of input devices connected. The display controller determines a distance between at least two input devices out of the plurality of input devices connected, the determination being made from the signals received by the information receiver. The touch panel controller enables or disables a function of the touch detection sensor based on the determination made by the display controller.

BRIEF DESCRIPTION OF DRAWINGS

FIG. 4 is a sequence diagram of a process for connecting the electronic pen to the display device in the first exemplary embodiment.

FIG. 5A is a flowchart used to describe an operation of transmitting information on the location of the electronic pen in the first exemplary embodiment.

FIG. 5B is a flowchart used to describe an operation of transmitting information on the distance between electronic pens.

FIG. 6A is a flowchart used to describe a display control operation that the display device in the first exemplary embodiment performs on the basis of an input from the electronic pen.

FIG. 6B is a flowchart used to describe an operation of controlling the touch panel.

DETAILED DESCRIPTION

Exemplary embodiments will be described in detail below by referring to accompanying drawings as appropriate. Herein, excessively detailed descriptions will sometimes be skipped. For example, detailed descriptions of known matters and the repetition of describing substantially identical configurations may be skipped. This skipping aims to prevent the following description from becoming excessively redundant, helping those skilled in the art understand the exemplary embodiments.

The accompanying drawings and the following description are given in order for those skilled in the art to sufficiently understand the present disclosure, and thus not intended to limit the subject matters in the descriptions of the claims.

In the exemplary embodiments that will be described below, a display device is an electronic device that enables the input and edit of information using input devices, such as electronic pens. Examples of such electronic devices include a smartphone and a tablet terminal.

First Exemplary Embodiment

A first exemplary embodiment will be described below with reference to FIGS. 1 to 6.

1-1. Configuration

1-1-1. Configuration of Display Device

Figure 1:
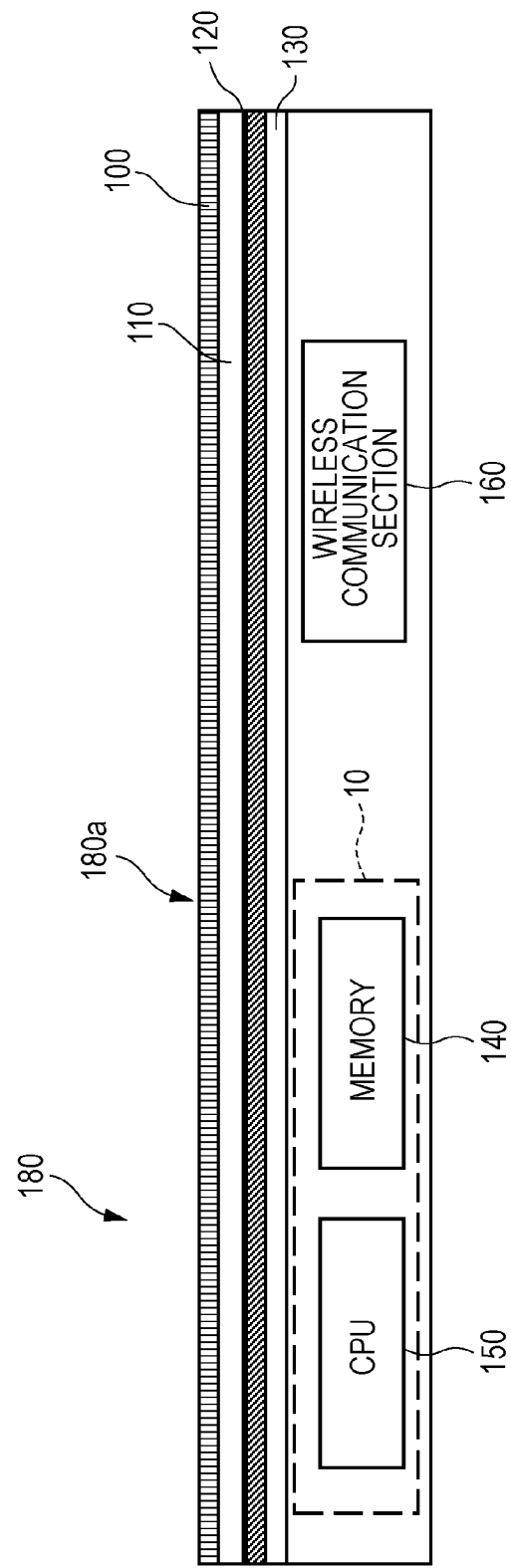
FIG. 1 is a drawing illustrating a cross-sectional configuration of a display device in a first exemplary embodiment.

As illustrated in FIG. 1, display device 180 (exemplary display device) has screen 180a (touch panel) that enables a drawing operation using electronic pens and a touching operation. Display device 180 includes dot-patterned film 100, cover glass 110, touch detection sensor 120 (exemplary touch detection sensor), liquid crystal panel 130, controller 10, and wireless communication section 160 (exemplary information receiver).

Dot-patterned film 100 is a film in which a specific array of dots is formed. An image processor (described later) in an electronic pen identifies the location of an image from a dot pattern within a predetermined area of dot-patterned film 100.

Cover glass 110 is glass used to protect liquid crystal panel 130 and touch detection sensor 120.

Touch detection sensor 120 includes transparent electrodes arranged in a lattice fashion, for example, and detects contact of a finger or other object with screen 180a by monitoring variations in voltages applied to the transparent electrodes.

Liquid crystal panel 130 displays a display pattern determined by display controller 13 described later. Liquid crystal panel 130 displays various pieces of information, including video, images such as different types of icons, and letters and characters for applications, on the basis of the display pattern.

Controller 10 includes CPU (central processing unit) (exemplary controller) 150 and memory 140. CPU 150 controls an entire behavior of display device 180 by reading and executing programs in memory 140. Memory 140 is a semiconductor memory, for example.

Wireless communication section 160 conducts short-distance wireless communication, such as Bluetooth (registered trademark) communication, and receives signals conforming to a predetermined communication scheme from electronic pen 250.

1-1-2. Configuration of Controller

Figure 2:
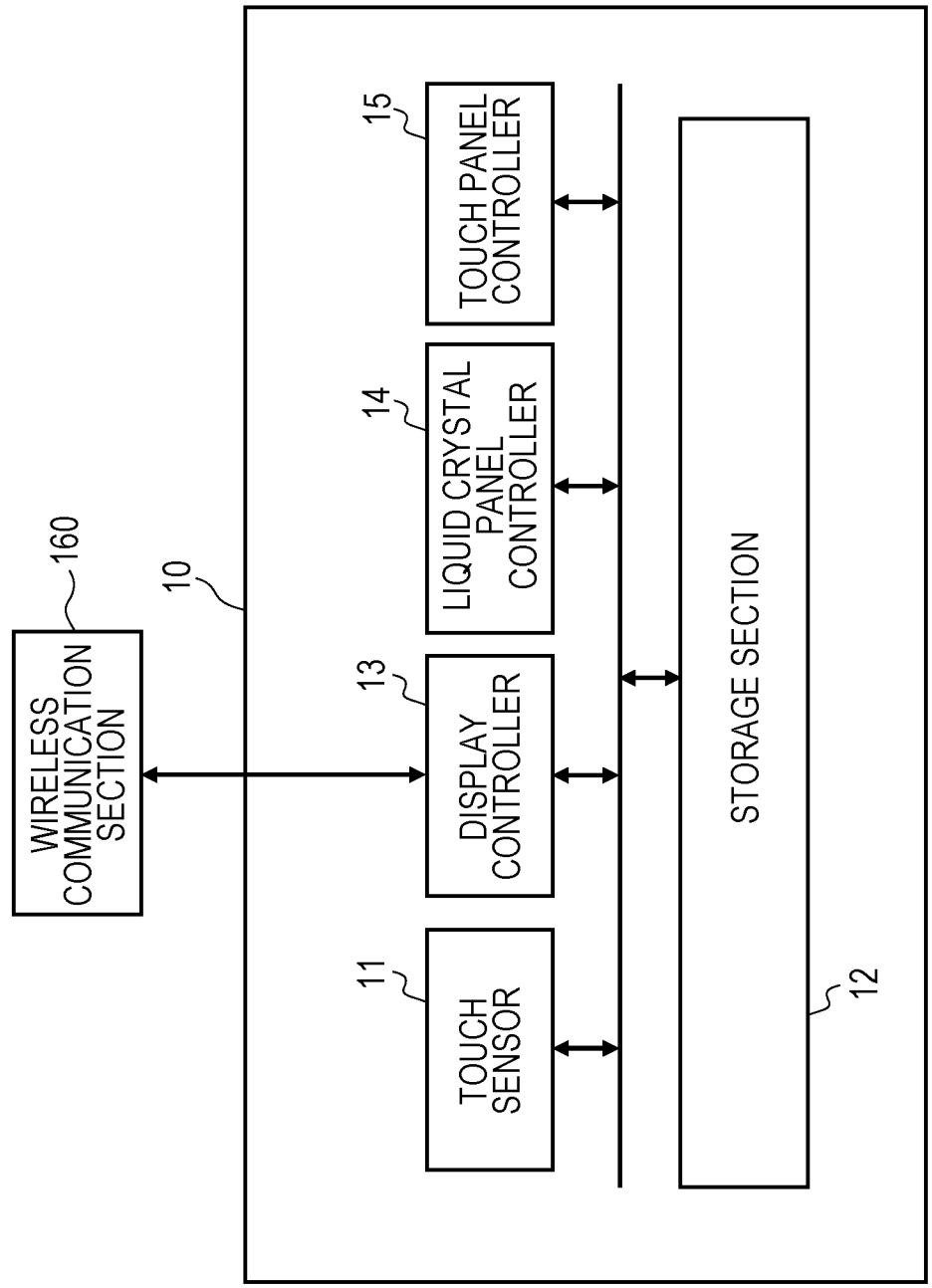
FIG. 2 is a drawing illustrating a configuration of a controller in the display device in the first exemplary embodiment.

FIG. 2 illustrates a configuration of controller 10. Controller 10 fulfills functions of touch sensor 11, display controller 13 (exemplary display controller), liquid crystal panel controller 14, and touch panel controller 15 (exemplary touch panel controller) by CPU 150 (FIG. 1) executing the programs. Storage section 12 is configured with memory 140.

Touch sensor 11 controls a voltage applied to, for example touch detection sensor 120 over liquid crystal panel 130, and monitors a variation in the voltage, for example. Furthermore, touch sensor 11 detects contact of a finger or other object with liquid crystal panel 130 and generates contact location information (coordinate data) on screen 180a. It should be noted that touch sensor 11 does not detect contact of an electronic pen in this exemplary embodiment with screen 180a.

Display controller 13 acquires the contact location information from touch sensor 11.

Display controller 13 also acquires location information and contact information regarding electronic pen 250 which wireless communication section 160 has received from electronic pen 250. The location information regarding electronic pen 250 is location information that has been read when a tip of electronic pen 250 contacts or comes close to dot-patterned film 100; and the contact information is contact information from a pen pressure sensor (described later). In addition, display controller 13 acquires distance information regarding a distance to another electronic pen from electronic pen 250 via wireless communication section 160.

Display controller 13 generates a display pattern on the basis of a locus of contact locations acquired from an electronic pen. Then, display controller 13 reports the display pattern to liquid crystal panel controller 14 in order to display this display pattern on liquid crystal panel 130. In addition, display controller 13 performs display control based on a user's gesture, such as "flick," "pinch in," or "pinch out," in accordance with detection signals from touch sensor 11.

Display controller 13 determines whether to enable or disable a function of touch detection sensor 120 on the basis of the distance information regarding a distance between electronic pen 250 and another electronic pen (a distance between a plurality of electronic pens which is calculated from the location information regarding the electronic pens). Then, display controller 13 reports a touch panel control command based on the determination to touch panel controller 15. More specifically, if the distance between electronic pen 250 and another electronic pen is equal to or less than a preset value, display controller 13 disables the function of touch detection sensor 120.

Display controller 13 also determines whether to enable or disable the function of touch detection sensor 120 on the basis of the location information regarding electronic pen 250. Then, display controller 13 reports a touch panel control command based on the determination to touch panel controller 15. More specifically, when the tip of electronic pen 250 is in contact with or placed close to screen 180a, display controller 13 disables the function of touch detection sensor 120.

Liquid crystal panel controller 14 displays the display pattern reported from display controller 13 on liquid crystal panel 130. In addition, liquid crystal panel controller 14 displays, on liquid crystal panel 130, the locus of the contact locations of electronic pen 250 which has been acquired from display controller 13.

Touch panel controller 15 enables or disables the detection performed by touch detection sensor 120 in accordance with the touch panel control command reported from display controller 13. When touch detection sensor 120 is enabled, more specifically when the touch panel function is enabled, display controller 13 performs display control based on a user's gesture, such as "flick," "pinch in," or "pinch out," in accordance with detection signals from touch sensor 11. When touch detection sensor 120 is disabled, more specifically when the touch panel function is disabled, display controller 13 halts the detection performed by touch sensor 11.

1-1-3. Configuration of Electronic Pen

Figure 3:
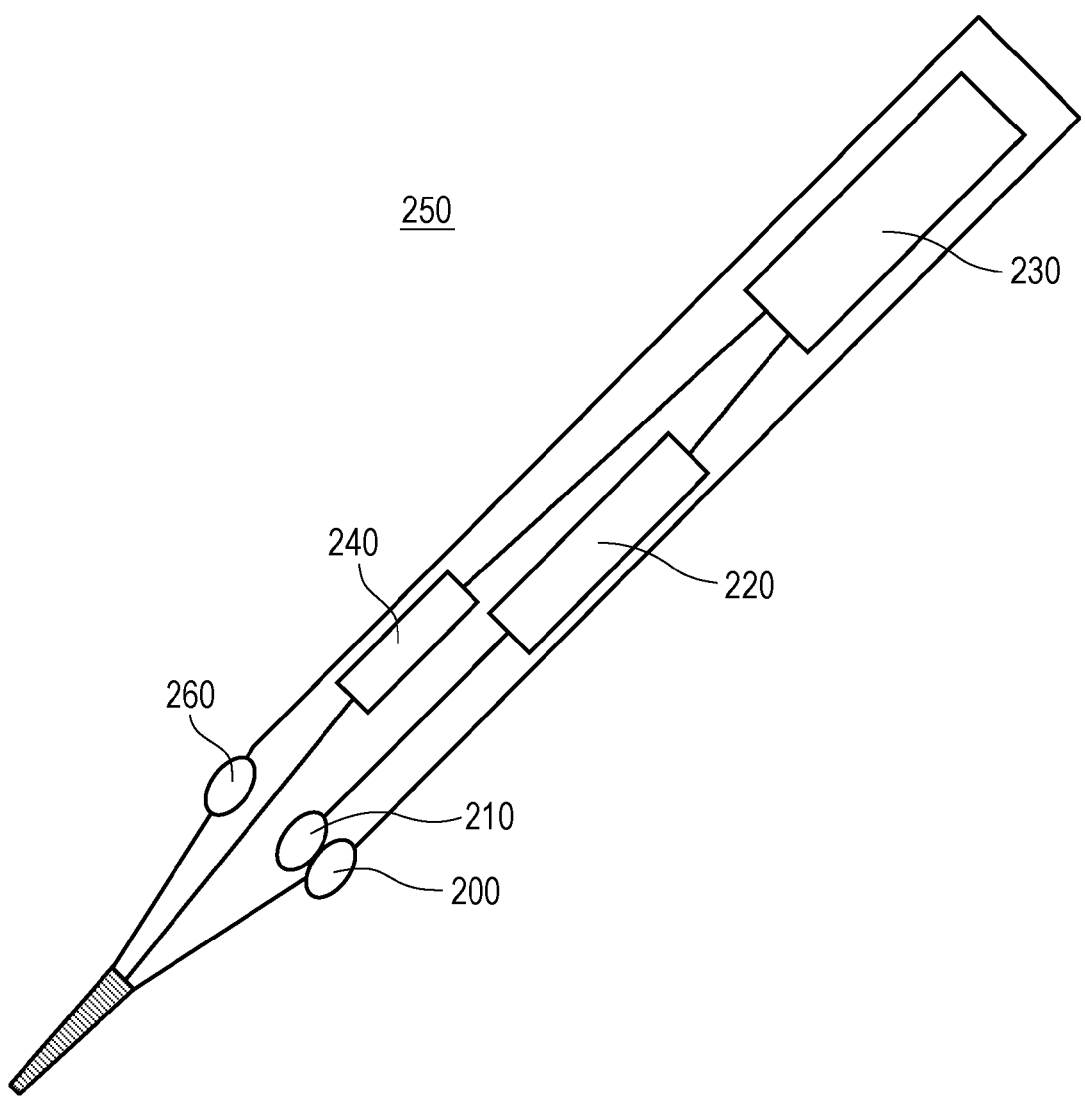
FIG. 3 is a drawing illustrating a configuration of an electronic pen in the first exemplary embodiment.

FIG. 3 is a drawing illustrating a configuration of an electronic pen (exemplary input device) in the first exemplary embodiment.

In FIG. 3, electronic pen 250 includes LED 200, image sensor 210, image processor 220, wireless communication section 230, pen pressure sensor 240, and proximity sensor 260.

LED 200 emits light.

Image sensor 210 detects reflection of the light emitted from LED 200, reading a dot pattern of locations of the tip of electronic pen 250 when electronic pen 250 is in contact with dot-patterned film 100. Image sensor 210 transmits image data including the read dot pattern to image processor 220. In this case, even if electronic pen 250 is not in contact with dot-patterned film 100, image sensor 210 can read the dot pattern in front of the tip of electronic pen 250 as long as electronic pen 250 is placed close to dot-patterned film 100.

Image processor 220 analyzes image data (dot pattern) acquired from image sensor 210. Then, image processor 220 generates the location information (coordinate data) regarding contact locations of the pen tip and transmits the location information to wireless communication section 230.

Wireless communication section 230 in electronic pen 250 acquires the location information regarding the pen tip from image processor 220, the contact information transferred from pen pressure sensor 240, and the distance information transferred from proximity sensor 260. Then, wireless communication section 230 transmits the acquired location information, contact information, and distance information to wireless communication section 160 in display device 180.

Pen pressure sensor 240 detects whether the tip of electronic pen 250 is in contact with dot-patterned film 100. If the tip of electronic pen 250 is in contact therewith, pen pressure sensor 240 detects the contact strength. Then, pen pressure sensor 240 transfers contact information indicating the detection result to wireless communication section 230 in electronic pen 250.

Proximity sensor 260 measures a distance between electronic pen 250 and another electronic pen. Then, proximity sensor 260 transmits the distance information indicating the measurement result to wireless communication section 230 in electronic pen 250.

Wireless communication section 230 transmits the distance information acquired from proximity sensor 260 to wireless communication section 160 in display device 180.

1-2. Operation

1-2-1. Process for Connecting Electronic Pen to Display Device

FIG. 4 shows a process for connecting (pairing) electronic pen 250 to display device 180. It should be noted that this connecting process is performed when a power supply to electronic pen 250 is first turned on.

First, wireless communication section 230 in electronic pen 250 transmits a pairing start request signal to wireless communication section 160 in display device 180 (S410).

Then, display device 180 receives the pairing start request signal and transmits a signal of requesting identification code of electronic pen 250 to electronic pen 250 (S411).

Electronic pen 250 receives the identification code request signal and transmits its identification code to display device 180 (S412).

Display device 180 receives the identification code of electronic pen 250, and then registers this identification code (S413) and transmits an ACK signal to electronic pen 250 (S414).

Electronic pen 250 receives the ACK signal and transmits a signal of requesting an identification code of display device 180 to display device 180 (S415).

Display device 180 receives the identification code request signal and transmits its identification code to electronic pen 250 (S416).

Electronic pen 250 receives the identification code of display device 180, and then registers this identification code (S417) and transmits an ACK signal to display device 180 (S418). In response to this, the pairing is concluded.

The above connecting process is exemplary. Alternatively, for example display device 180 may transmit a pairing start request signal, and the connecting process may be performed with display device 180 and electronic pen 250 in FIG. 4 reversed.

1-2-2. Operation of Electronic Pen

FIG. 5 is a flowchart of an operation of electronic pen 250. FIG. 5A shows an operation of transmitting the location information regarding electronic pen 250 (including the contact information regarding the pen tip); and FIG. 5B shows an operation of transmitting the information on the distance between the electronic pens. The operations in FIGS. 5A and 5B are performed in parallel after the pairing of electronic pen 250 with display device 180 (FIG. 4) has been concluded and the power supplies to both electronic pen 250 and display device 180 have been turned on.

Transmitting Location Information Regarding Electronic Pen

As shown in FIG. 5A, image sensor 210 in electronic pen 250 detects that the tip of electronic pen 250 is placed close to or in contact with dot-patterned film 100 in display device 180 (S510). If electronic pen 250 fails to acquire a dot pattern because electronic pen 250 is neither in contact with nor placed close to dot-patterned film 100 (NO in S516), the processing returns to S510 unless the power supply is turned off.

If detecting that the tip of electronic pen 250 is placed close to or in contact with dot-patterned film 100, image sensor 210 reads a dot pattern of locations of the pen tip and transmits in real time the captured image data to image processor 220 (S511).

Image processor 220 generates the location information (coordinate data) regarding the contact or proximity location of the pen tip (S512). When electronic pen 250 is in contact with or placed close to dot-patterned film 100, image processor 220 can analyze the dot pattern from the acquired image data. In this case, image processor 220 generates the location information from the analyzed dot pattern.

When acquiring the location information from image processor 220, wireless communication section 230 further determines whether to have acquired the contact information from pen pressure sensor 240 (S513).

If electronic pen 250 is in contact with a surface of display device 180, wireless communication section 230 transmits the location information and the contact information to display device 180 (wireless communication section 160) (S514).

If electronic pen 250 is not in contact with the surface of display device 180 (NO in S513), more specifically if image processor 220 receives no contact information from pen pressure sensor 240, wireless communication section 230 transmits only the location information to display device 180 (wireless communication section 160) (S515).

The above process is repeated until the power supply to electronic pen 250 is turned off (S516).

Acquiring and Transmitting Information Regarding Distance Between Electronic Pens As shown in FIG. 5B, proximity sensor 260 in electronic pen 250 acquires a distance between electronic pen 250 and another electronic pen via wireless communication section 160 in display device 180 (S520). Proximity sensor 260 measures the distance between electronic pen 250 and another electronic pen and transmits this distance information to wireless communication section 230. In this case, "another electronic pen" is connectable to display device 180, and the power supply to the electronic pen is in an ON state. If proximity sensor 260 acquires the distance information, the processing proceeds to S521; whereas if proximity sensor 260 fails to acquire the distance information (NO in S522), the processing returns to S520 unless the power supply is turned off.

Wireless communication section 230 transmits the distance information to display device 180 (wireless communication section 160) (S521).

The above process is repeated until the power supply to electronic pen 250 is turned off (S522).

1-2-3. Operation of Display Device

FIG. 6 is a flowchart of an operation of display device 180. FIG. 6A shows a display control operation of display device 180 performed using electronic pen 250; and FIG. 6B shows a control operation of a touch panel. It should be noted that the operations shown in FIGS. 6A and 6B are performed in parallel.

Display Control Operation with Input from Electronic Pen

As shown in FIG. 6A, display controller 13 in display device 180 receives a signal from electronic pen 250 via wireless communication section 160, and determines from this signal whether to have received the location information and the contact information regarding electronic pen 250 (S610). As described above, the location information is location information (coordinate data) read when electronic pen 250 is in contact with or placed close to dot-patterned film 100. The contact information is information detected by pen pressure sensor 240 in electronic pen 250. If display controller 13 receives both the location information and the contact information, the processing proceeds to a display process after S611. If display controller 13 receives neither the location information nor the contact information, the display process is not performed. If display controller 13 receives only the location information, the processing does not proceed to the display process either, because the tip of electronic pen 250 is not considered to contact screen 180a.

If receiving both the location information and the contact information, display controller 13 generates a display pattern in accordance with a locus of contact locations of electronic pen which have been acquired (S611).

Liquid crystal panel controller 14 controls liquid crystal panel 130 to display the display pattern generated by display controller 13 (S613).

The above process is repeated until the power supply to display device 180 is turned off (S614).

Operation of Controlling Touch Panel

As shown in FIG. 6B, display controller 13 in display device 180 receives a signal from electronic pen 250 via wireless communication section 160 and determines from this signal which of the distance information regarding a distance to another electronic pen and the location information has been received. The distance information is information detected by proximity sensor in electronic pen 250. If display controller 13 receives the distance information ("DISTANCE" in S620), the processing proceeds to S621. If display controller 13 receives the location information ("LOCATION" in S620), the processing proceeds to S622. If display controller 13 receives neither the distance information nor the location information, the processing proceeds to S623. Examples of the case where display controller 13 fails to receive the distance information include a case where no other electronic pens are detected around electronic pen 250 and a case where no other electronic pens are present close to electronic pen 250.

If the distance between the two electronic pens is equal to or less than the preset value (YES in S621), namely, if the electronic pens are placed close to each other, display controller 13 outputs the touch panel control command to touch panel controller 15 in order to disable the touch panel function. In this exemplary embodiment, the preset value is set to be equal to a length of a diagonal line of liquid crystal panel 130, for example. With this setting, if a plurality of electronic pens 250 are present over liquid crystal panel 130, it can be determined that at least two electronic pens are placed close to each other. This is because a distance between the two electronic pens is equal to or less than the length of the diagonal line of liquid crystal panel 130.

If display controller 13 receives the location information regarding electronic pen 250 ("LOCATION" in S620), namely, if the tip of electronic pen 250 is in contact with or placed close to screen 180a, display controller 13 outputs the touch panel control command to touch panel controller 15 in order to disable the function of touch detection sensor 120. This can prevent a malfunction of touch detection sensor 120 which would occur in response to contact of a finger or other object with touch detection sensor 120 when electronic pen 250 performs a drawing operation.

Touch panel controller 15 receives the touch panel control command from display controller 13 and disables the function of touch detection sensor 120 (S622). If the touch panel function is already disabled, touch panel controller 15 maintains this disabled state.

If the distance between the two electronic pens is greater than the preset value (NO in S621), namely, if the electronic pens are placed away from each other, display controller 13 outputs the touch panel control command to touch panel controller 15 in order to enable the touch panel function.

Touch panel controller 15 receives the touch panel control command reported from display controller 13 and enables the function of touch detection sensor 120 (Step S623). If the touch panel function is already enabled, touch panel controller 15 maintains this enabled state.

The above process is repeated until the power supply to display device 180 is turned off (S624).

1-3. Effect and the Like

Display device 180 according to the first exemplary embodiment has screen 180a on which information is displayed in accordance with inputs from a plurality of electronic pens 250 (exemplary input devices) and a touch input. Display device 180 includes: touch detection sensor 120 that detects a touch on screen 180a; wireless communication section 160 (exemplary information receiver) that can receive signals from a plurality of electronic pens 250 connected; display controller 13 (exemplary display controller); and touch panel controller 15 (exemplary touch panel controller). Display controller 13 determines a distance between at least two electronic pens 250 out of the plurality of electronic pens 250 connected, from the signals received via wireless communication section 160. Touch panel controller 15 enables or disables a function of touch detection sensor 120 on the basis of the above determination. If the distance between the at least two electronic pens 250 is equal to or less than the preset value, for example, touch panel controller 15 disables the function of touch detection sensor 120.

In this way, the function of a touch panel can be disabled when the plurality of electronic pens 250, which act as the input devices, are placed close to one another. For example, there are cases where it is unclear whether electronic pen 250 is placed close to screen 180a (e.g., a distance between electronic pen 250 and the screen is unclear because the tip of electronic pen 250 is placed away from screen 180a). In this case, even if a hand with electronic pen 250 accidentally contacts screen 180a when the plurality of electronic pens 250 are used simultaneously, for example, display device 180 responds to only the contact of electronic pen 250 and thus does not respond to the contact of the hand.

As described above, display device 180 can reliably prevent a malfunction of the touch panel when a plurality of users individually use their electronic pens 250.

When a distance between at least two electronic pens 250 is greater than the preset value and the plurality of electronic pens 250 are neither placed closer to nor in contact with the screen, touch panel controller 15 in display device 180 enables the function of touch detection sensor 120. In this way, a malfunction of the touch panel which would be caused against a user's decision can be reliably prevented.

Other Exemplary Embodiments

In the first exemplary embodiment, electronic pens are used as input devices; however, the input devices are not limited to such electronic pens. Alternatively, other input devices that do not take the shape of a pen and have an LED, an image sensor, an image processor, a wireless communication section, and a pen pressure sensor, for example, may be used.

Each of the sections provided in the first exemplary embodiment may be implemented using a single chip formed of a semiconductor device, such as an LSI. Alternatively, some or all of the sections may be implemented using a single chip.

Some or all of the processes performed in the functional blocks may be implemented using a program. Some or all of the processes performed in the functional blocks in each exemplary embodiment may be performed by a central processing unit (CPU) in a computer. Programs used to perform the individual processes may be stored in a storage device, such as a hard disk or a ROM, and executed in the ROM or read out to and executed in the RAM.

The individual processes in the foregoing exemplary embodiments may be implemented in either hardware or software (alone or together with an OS (operating system), middleware, or a predetermined library). The individual processes may be implemented using processes performed in combination with software and hardware.

The execution sequence of the process method in the above exemplary embodiments is not limited to the execution sequence described in the foregoing exemplary embodiments. Alternatively, the execution sequence can be changed without departing from the spirit of the present invention.

The display control method, a computer program that causes a computer to perform this method, and a computer readable recording medium that stores this program, which have been described in the foregoing exemplary embodiments, should fall within the scope of the present invention. Examples of such computer readable recording media include a flexible disk, a hard disk, a CD-ROM, an MO (magneto-optical disk), a DVD, a DVD-ROM, a DVD-RAM, a BD (Blu-ray (registered trademark) disc), and a semiconductor memory.

The above computer program is not limited to a computer program stored in the above recording medium, and may be transmitted via an electrical communication line, a wireless or wired communication line, or a network represented by the Internet.

The execution sequence of the process method in the above exemplary embodiments is not limited to the execution sequence described in the foregoing exemplary embodiments. Alternatively, the execution sequence may be changed without departing from the spirit of the present invention.

As described above, the first exemplary embodiment, which is an exemplary technique disclosed in the present application, has been described. However, the technique in the present disclosure is not limited to the first exemplary embodiment and applicable to exemplary embodiments that undergo modifications, replacements, additions, omissions, and the like.

The present disclosure is applicable to display devices to which information can be input through operations of input devices, such as electronic pens, and a touch panel. More specifically, the present disclosure is applicable to smartphones, tablet terminals, and other information processing devices.

The invention claimed is:

1. A display device that is connectable to a plurality of input devices and has a screen on which information is displayed in accordance with inputs from a plurality of input devices and a touch input, the display device comprising:
    a touch detection sensor that detects a touch on the screen;
    an information receiver capable of receiving signals from the plurality of input devices connected;
    a display controller that determines a distance between at least two input devices out of the plurality of input devices connected, the determination being made from the signals received by the information receiver; and
    a touch panel controller that enables or disables a function of the touch detection sensor based on the determination made by the display controller.

2. The display device according to claim 1, wherein when the distance between the at least two input devices is equal to or less than a preset value, the touch panel controller disables the function of the touch detection sensor.

3. The display device according to claim 1, wherein when the distance between the at least two input devices is greater than a preset value, the touch panel controller enables the function of the touch detection sensor.

4. The display device according to claim 2, wherein when the distance between the at least two input devices is greater than the preset value, the touch panel controller enables the function of the touch detection sensor.

5. The display device according to claim 1, wherein when the distance between the at least two input devices is greater than a preset value and the plurality of input devices are neither placed close to the screen nor in contact with the screen, the touch panel controller enables the function of the touch detection sensor.

6. The display device according to claim 2, wherein when the distance between the at least two input devices is greater than the preset value and the plurality of input devices are neither placed close to the screen nor in contact with the screen, the touch panel controller enables the function of the touch detection sensor.

7. The display device according to claim 1, wherein when the touch panel controller fails to acquire the distance between the at least two input devices, the touch panel controller enables the function of the touch detection sensor.

8. The display device according to claim 2, wherein the preset value is equal to a length of a diagonal line of the screen.

9. The display device according to claim 1, wherein each of the plurality of input devices is an electronic pen.

* * * * *